A. CANTERBURY.
Seed and Grain Drills.

No. 155,420.  Patented Sept. 29, 1874.

WITNESSES:  
Anas. Nida  
O. Sedgwick

INVENTOR:  
A. Canterbury  
BY  
Munn & Co.  
ATTORNEYS.

UNITED STATES PATENT OFFICE.

ASA CANTERBURY, OF GIBSON CITY, ILLINOIS.

IMPROVEMENT IN SEED AND GRAIN DRILLS.

Specification forming part of Letters Patent No. 155,420, dated September 29, 1874; application filed July 3, 1874.

*To all whom it may concern:*

Figure 1:
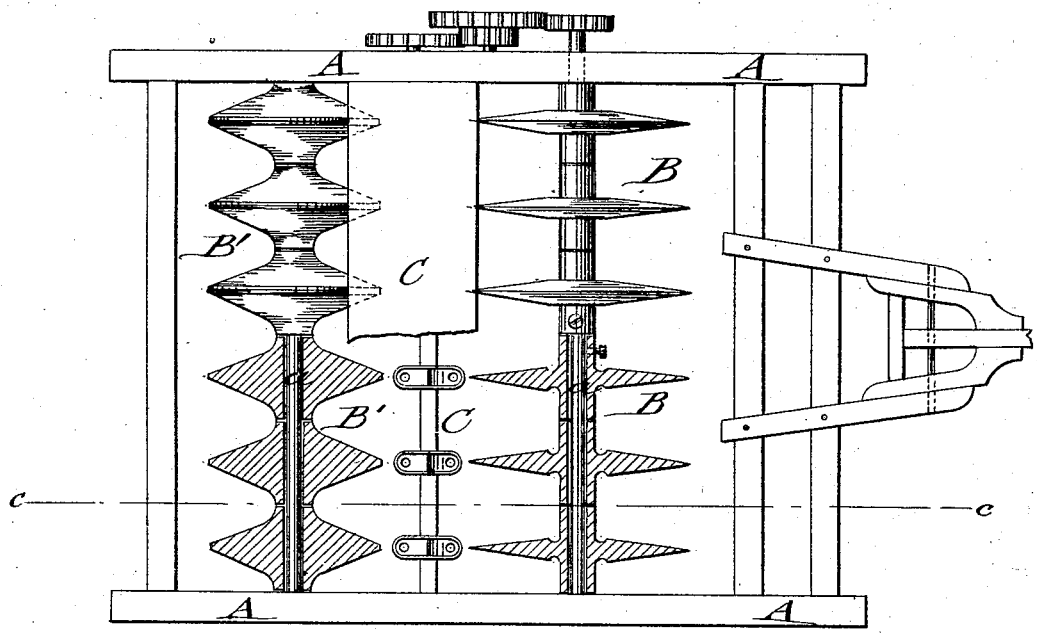
Figure 2:
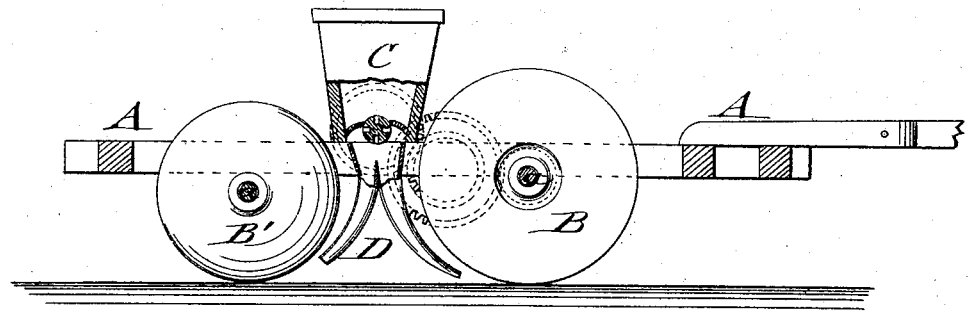

Be it known that I, ASA CANTERBURY, of Gibson City, in the county of Ford and State of Illinois, have invented a new and Improved Combined Grain and Seed Drill, of which the following is a specification:

In the accompanying drawing, Figure 1 represents a top view of my improved combined drill for sowing grain and seed, partly in horizontal section, and Fig. 2 represents a vertical longitudinal section of the same on the line $c\ c$, Fig. 1.

Similar letters of reference indicate corresponding parts.

The object of my invention is to provide an improved drill, by which the sowing of grain and grass seed may be jointly accomplished in a more complete and rapid manner after plowing, so as to be deposited and covered favorably to the action of the soil and the weather. My invention consists in the arrangement of a series of sharp rotating cutters, with a second series of duller revolving cutters running in the same furrows, for sowing the grain and grass seed in connection with a suitably-constructed seed-dropping and conveying mechanism.

In the drawing, A represents the supporting-frame, constructed of rectangular shape and suitable strength, to be drawn by one or more horses. Lateral shafts $a$ turn in bearings of frame A, and carry upon them a series of revolving cutters, B B', strung loosely upon the shafts, with the exception of two center-wheel cutters, keyed to front shaft for turning the axle or shaft $a$, and operating thereby the seed-dropping mechanism C. The cutters B B' are arranged at equal distance from each other, the front series being constructed of solid iron, with sharp cutting-edges for penetrating sufficiently deep into the ground. The rear cutters B run exactly in the furrows of the front cutters, and are provided with dull edges, about a quarter of an inch square across the edge, and hollow, so as to prevent their cutting as deep as the front ones, and make the drill-marks wider, breaking also all the clods dropping sidewise into the front furrow. The loose cutters admit the rolling forward and backward and the readier turning of the drill. Between the front and rear cutters is arranged laterally the seed-dropping mechanism C, of suitable construction. The seed-feeding and regulating slide-piece is operated in the usual manner, as in other drills, by gear-wheels connected with the rotating front shaft. The hopper has front and rear seed-cups for attaching tubular spouts D, extending in circular shape down under cutters for depositing grain and seed in drill-marks before the dirt falls back. The spouts are connected to seed-cups by means of heavy canvas cloth or other flexible material, so as to allow the spouts to bounce up without breaking when being carried against a stone, stump, or other obstruction. The rear spouts D are made shorter than the front spouts, and do not extend as far toward the edge of the cutters. They are employed for conveying grass-seed into the drill-marks or furrows after the earth, dropping sidewise over the grain, has covered the same sufficiently. The grass is also spread over a larger surface, as the furrows are wider and the spouts higher. The rear cups and spouts start from seed-box a little sidewise of front spouts, so as to allow the operator to see both at work.

The seed-box is so divided that grain and grass seed may be sown separately or at the same time.

The seed-dropping mechanism may be readily thrown out of gear with the front shaft by a suitable lever when going to and from the work, but does not require ungearing when turning on the field, as the side cutters turn loosely on the shaft while the middle one remains stationary without turning the shaft and dropping seed thereby. This saves lifting at the ends, and gives ease of motion to the drill without dragging.

The grain and seed deposited by the drill is well protected against drouth, requires less preparation of the ground, and saves time and labor in working the same.

I am aware of the patent granted to W. B. Quarton, January 8, 1861; but

What I claim is—

The combination, in a seeder, with sharp, deeply furrowing-wheels B, curved spouts D, to drill the grain, reversely-curved spouts D, to drill the grass-seed on the nearly-filled furrow, and small blunt wheels B' that press the pulverized soil to and shallowly over the grass-seed, all constructed and arranged substantially as and for the purpose specified.

ASA CANTERBURY.

Witnesses:
J. H. COLLIER,
CALEB McKEESE.